US011971098B2

(12) United States Patent
Torisu et al.

(10) Patent No.: US 11,971,098 B2
(45) Date of Patent: Apr. 30, 2024

(54) POWER TRANSMISSION DEVICE AND POWER TRANSMISSION METHOD

(71) Applicant: KOMATSU LTD., Tokyo (JP)

(72) Inventors: Hironori Torisu, Tokyo (JP); Takuro Yoneda, Tokyo (JP); Tetsuya Yamauchi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 52 days.

(21) Appl. No.: 17/783,360

(22) PCT Filed: Jan. 18, 2021

(86) PCT No.: PCT/JP2021/001506
§ 371 (c)(1),
(2) Date: Jun. 8, 2022

(87) PCT Pub. No.: WO2021/192540
PCT Pub. Date: Sep. 30, 2021

(65) Prior Publication Data

US 2023/0016070 A1 Jan. 19, 2023

(30) Foreign Application Priority Data

Mar. 24, 2020 (JP) ................................ 2020-053170

(51) Int. Cl.
*F16H 61/14* (2006.01)
*B60K 17/10* (2006.01)
(Continued)

(52) U.S. Cl.
CPC .......... *F16H 61/143* (2013.01); *B60K 17/10* (2013.01); *F16H 45/02* (2013.01);
(Continued)

(58) Field of Classification Search
CPC ........ F16H 61/143; F16H 61/14; F16H 45/02; F16H 2045/021; F16H 2045/0215;
(Continued)

(56) References Cited

U.S. PATENT DOCUMENTS 4,448,293 A * 5/1984 Maeda .................... F16H 61/14 192/3.3
6,419,059 B1 7/2002 Nobu et al.
(Continued)

FOREIGN PATENT DOCUMENTS

CN 101614270 A 12/2009
CN 101809329 A 8/2010
(Continued)

OTHER PUBLICATIONS

The International Search Report for the corresponding international application No. PCT/JP2021/001506, dated Mar. 16, 2021.
(Continued)

*Primary Examiner* — Richard M Lorence
(74) *Attorney, Agent, or Firm* — Global IP Counselors, LLP

(57) ABSTRACT

A power transmission device includes a torque converter device, a first hydraulic pump, a first oil channel, a second oil channel, a third oil channel, a second pressure control valve, and a controller. The torque converter device has a torque converter and a lock-up clutch. The first oil channel supplies hydraulic fluid from the first hydraulic pump to the torque converter. The second oil channel drains hydraulic fluid from the torque converter. The third oil channel communicates with the first oil channel and the second oil channel. The second pressure control valve is disposed in the third oil channel. The controller sets the second pressure control valve to an open state when the lock-up clutch is in an engaged state.

5 Claims, 4 Drawing Sheets

(51) Int. Cl.
*F16H 45/02* (2006.01)
*F16H 59/44* (2006.01)
*F16H 61/00* (2006.01)
*F16H 61/02* (2006.01)

(52) U.S. Cl.
CPC ..... *F16H 61/0031* (2013.01); *F16H 61/0206* (2013.01); *F16H 2045/0215* (2013.01); *F16H 59/44* (2013.01); *F16H 61/0021* (2013.01)

(58) Field of Classification Search
CPC .. F16H 59/44; F16H 61/0021; F16H 61/0031; F16H 61/0206; F16H 61/41; B60K 17/10
See application file for complete search history.

(56) References Cited

U.S. PATENT DOCUMENTS

| | | | | |
|---|---|---|---|---|
| 2002/0019295 | A1* | 2/2002 | Kobayashi .............. | F16H 63/46 477/174 |
| 2010/0204008 | A1 | 8/2010 | Azuma et al. | |
| 2011/0046858 | A1 | 2/2011 | Takahashi et al. | |
| 2011/0276237 | A1 | 11/2011 | Yamaguchi et al. | |
| 2012/0245805 | A1 | 9/2012 | Yamaguchi et al. | |
| 2013/0284009 | A1 | 10/2013 | Mitsui et al. | |

FOREIGN PATENT DOCUMENTS

| | | | |
|---|---|---|---|
| CN | 10182828054 | A | 9/2010 |
| CN | 103154580 | A | 6/2013 |
| EP | 1 055 846 | A2 | 11/2000 |
| IN | 101994825 | A | 3/2011 |
| JP | 2001-116137 | A | 4/2001 |
| JP | 2001-271906 | A | 10/2001 |
| JP | 2008-274972 | A | 11/2008 |
| JP | 2009-210112 | A | 9/2009 |
| JP | 2010-203535 | A | 9/2010 |
| SU | 1039749 | A | 9/1983 |
| WO | 2011/099568 | A1 | 8/2011 |

OTHER PUBLICATIONS

The Office Action for the corresponding Chinese application No. 202180007238.5, dated Sep. 21, 2023.

* cited by examiner

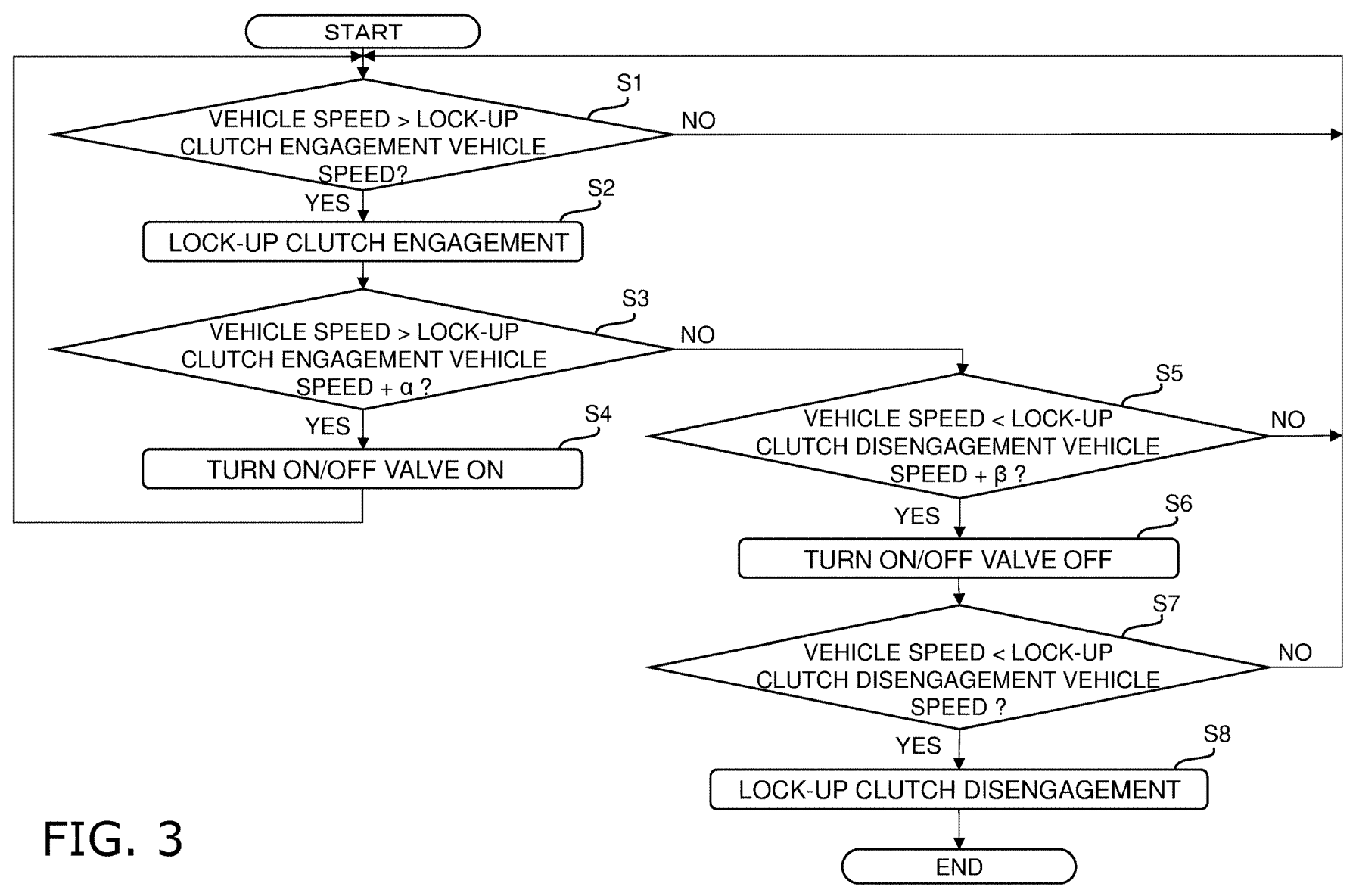

START

S1 VEHICLE SPEED > LOCK-UP CLUTCH ENGAGEMENT VEHICLE SPEED?

YES

NO

S2 LOCK-UP CLUTCH ENGAGEMENT

S3 VEHICLE SPEED > LOCK-UP CLUTCH ENGAGEMENT VEHICLE SPEED + α ?

YES

NO

S4 TURN ON/OFF VALVE ON

S5 VEHICLE SPEED < LOCK-UP CLUTCH DISENGAGEMENT VEHICLE SPEED + β ?

YES

NO

S6 TURN ON/OFF VALVE OFF

S7 VEHICLE SPEED < LOCK-UP CLUTCH DISENGAGEMENT VEHICLE SPEED ?

YES

NO

S8 LOCK-UP CLUTCH DISENGAGEMENT

END

FIG. 3

POWER TRANSMISSION DEVICE AND POWER TRANSMISSION METHOD

CROSS-REFERENCE TO RELATED APPLICATIONS

This application is a U.S. National stage application of International Application No. PCT/JP2021/0001506, filed on Jan. 18, 2021. This U.S. National stage application claims priority under 35 U.S.C. § 119(a) to Japanese Patent Application No. 2020-053170, filed in Japan on Mar. 24, 2020, the entire contents of which are hereby incorporated herein by reference.

BACKGROUND

Technical Field

The present invention relates to a power transmission device and a power transmission method.

Background Information

Conventionally, a work vehicle (such as a wheel loader or the like) is known that is provided with a torque converter device having a torque converter and a lock-up clutch. In the torque converter device, power from the engine is transmitted to a travel device through the torque converter if the lock-up clutch is in a disengaged state and is transmitted to the travel device through the lock-up clutch if the lock-up clutch is in an engaged state (see International Publication No. WO 2011-099568).

SUMMARY

The internal pressure of the torque converter increases even while the lock-up clutch is in the engaged state in International Publication No. WO 2011-099568. In this case, the loss of horsepower in the hydraulic pump increases because there is a need to continually maintain the discharge pressure of the hydraulic pump at a high level.

An object of the present disclosure is to provide a power transmission device and a power transmission method that can suppress the loss of horsepower in a hydraulic pump.

A power transmission device according to the present disclosure is disposed between a power source and a travel device, and comprises a torque converter device, a first hydraulic pump, a first oil channel, a second oil channel, a third oil channel, a pressure control valve, and a controller. The torque converter device includes a torque converter and a lock-up clutch and transmits power from the power source to the travel device. The first hydraulic pump is driven by the power source. The first oil channel supplies hydraulic fluid from the first hydraulic pump to the torque converter. The second oil channel drains hydraulic fluid from the torque converter. The third oil channel communicates with the first oil channel and the second oil channel. The pressure control valve is disposed in the second oil channel or the third oil channel. The controller causes the pressure control valve to open and close. The controller sets the pressure control valve to an open state when the lock-up clutch is in an engaged state.

According to the present disclosure, there can be provided a power transmission device and a power transmission method that can suppress loss of horsepower in a hydraulic pump.

BRIEF DESCRIPTION OF DRAWINGS

FIG. 3 is a flow chart for explaining a power transmission method according to the first embodiment.

DESCRIPTION OF EMBODIMENTS

An embodiment of the power transmission device according to the present disclosure will be explained with reference to the drawings. The power transmission device according to the present disclosure is mounted in a work vehicle. The work vehicle may be, for example, a wheel loader, a dump truck, a bulldozer, a forklift, or the like but is not limited as such.

1. First Embodiment

Figure 1:
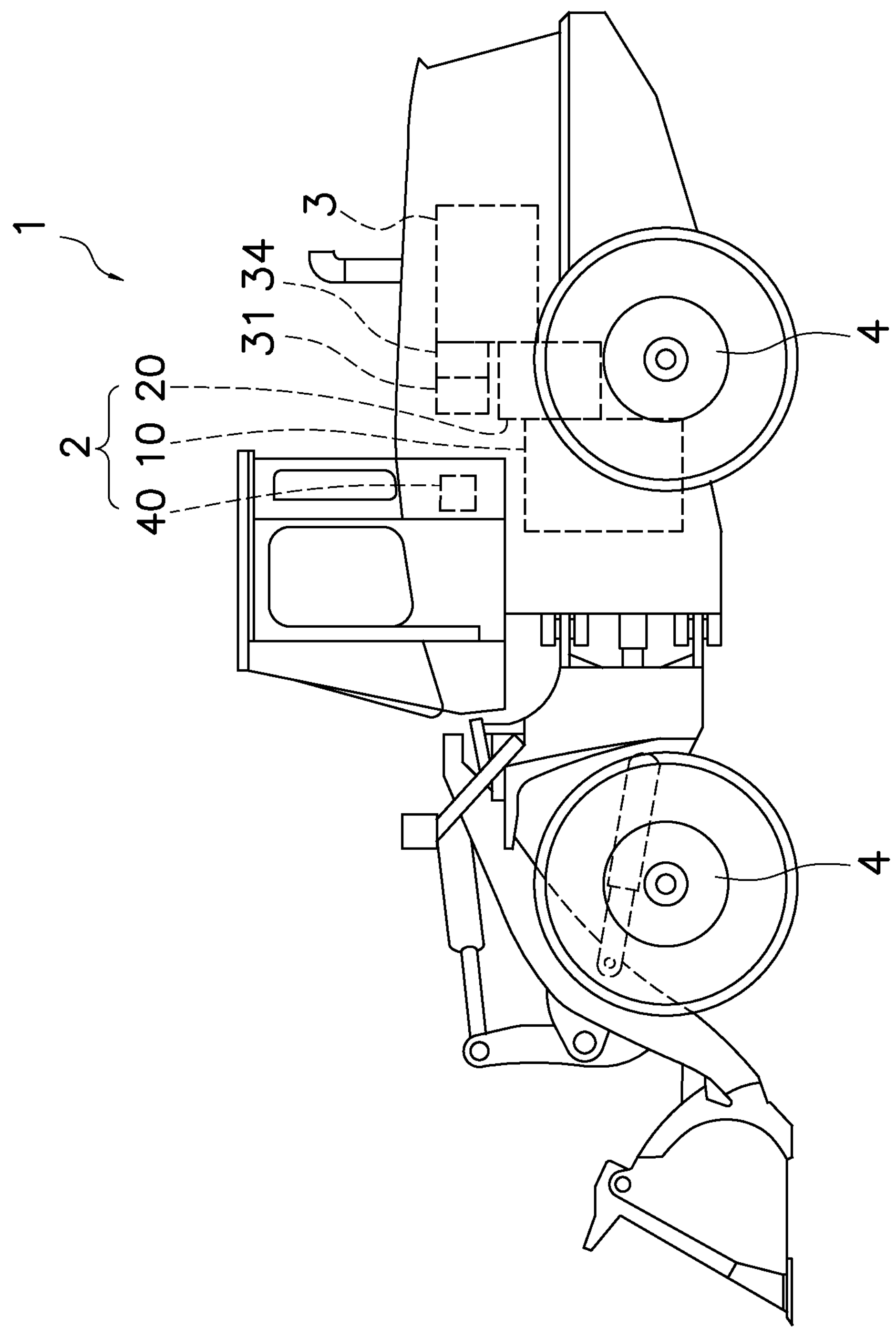
FIG. 1 is a side view of a work vehicle according to an embodiment.
Figure 2:
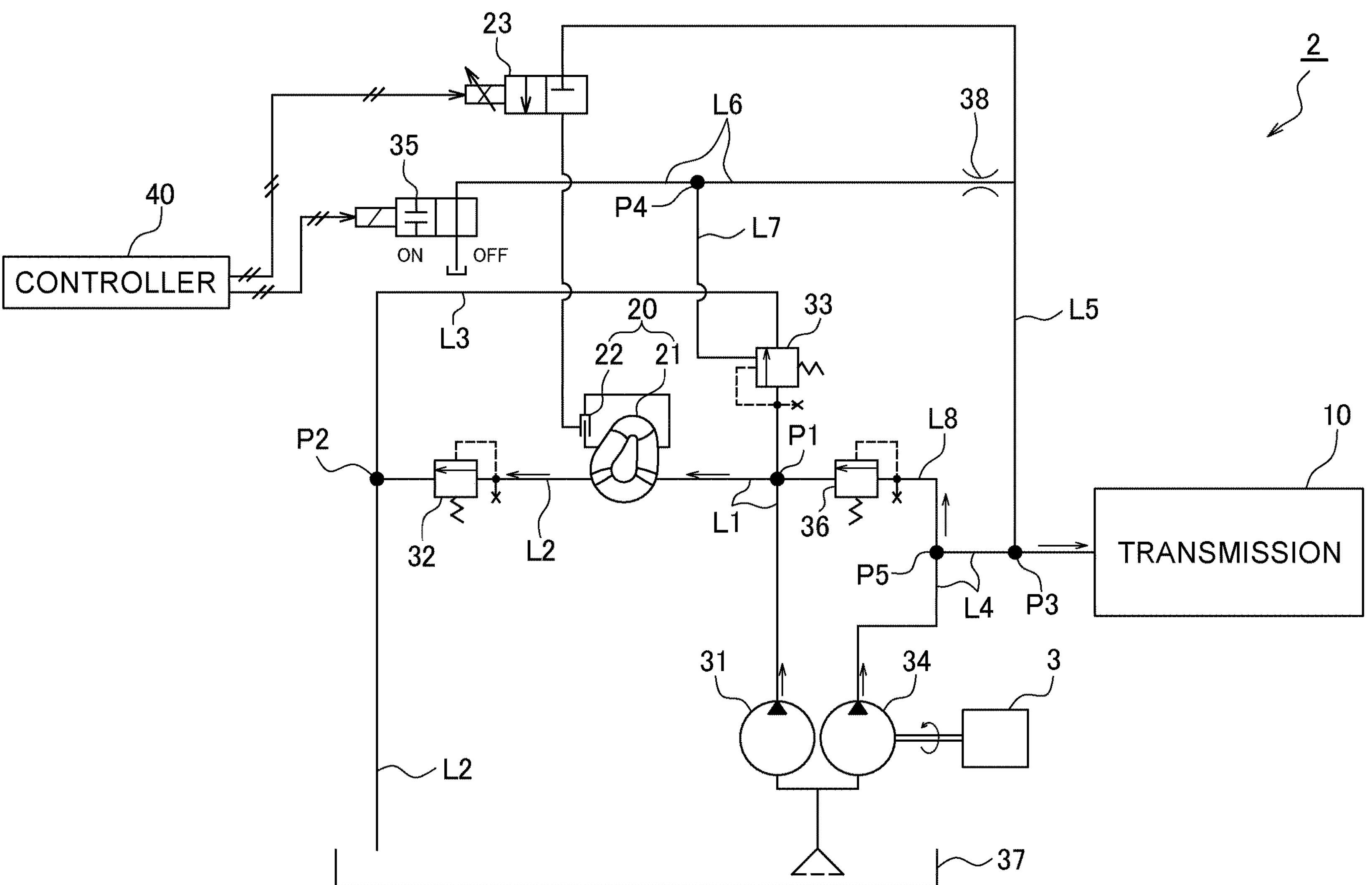
FIG. 2 is a hydraulic circuit diagram of a power transmission system according to a first embodiment.

FIG. 1 is a side view of a work vehicle 1 according to the first embodiment. FIG. 2 is a configuration diagram schematically illustrating a configuration of a power transmission device 2 according to the first embodiment.

The work vehicle 1 according to the present embodiment is a wheel loader. The work vehicle 1 is provided with the power transmission device 2, a power source 3, and a travel device 4. The power transmission device 2 is disposed between the power source 3 and the travel device 4. The power source 3 is, for example, an engine.

The power transmission device illustrated in FIG. 2 is mounted to the work vehicle 1.

(Configuration of the Power Transmission Device 2)

The power transmission device 2 has a transmission 10, a torque converter device 20, a hydraulic circuit, and a controller 40.

The transmission 10 is disposed between the torque converter device 20 and the travel device 4. The transmission 10 is coupled to the torque converter device 20 and transmits the power from the power source 3 transmitted through the torque converter device 20, to the travel device 4. In the present embodiment, the transmission 10 is an example of a hydraulic apparatus.

The torque converter device 20 is disposed between the power source 3 and the transmission 10. The torque converter device 20 is coupled to an output shaft of the power source 3 and an input shaft of the transmission 10.

The torque converter device 20 has a torque converter 21 and a lock-up clutch 22. The torque converter 21 includes an impeller, a turbine, and a stator. The lock-up clutch 22 is a hydraulic actuation-type clutch and can be switched between an engaged state and a disengaged state. The clutch pressure of the lock-up clutch 22 is adjusted with a lock-up clutch control valve 23. The lock-up clutch control valve 23 is controlled by the controller 40.

When the lock-up clutch 22 is in the disengaged state, the torque converter 21 transmits the power from the power source 3 to the transmission 10 using oil as a medium. When the lock-up clutch 22 is in the engaged state, the lock-up clutch 22 couples the impeller and the turbine of the torque converter 21 and transmits the power from the power source 3 to the transmission 10.

The hydraulic circuit has first to eighth oil channels L1-L8, a first hydraulic pump 31, a first pressure control valve 32, a second pressure control valve 33, a second hydraulic pump 34, an on/off valve 35, a third pressure control valve 36, and an oil pan 37.

The first oil channel L1 communicates with the first hydraulic pump 31 and the torque converter 21. The first oil channel L1 is an oil supply channel for supplying hydraulic fluid from the first hydraulic pump 31 to the torque converter 21.

The first hydraulic pump 31 is driven by the power source 3. The first hydraulic pump 31 is a fixed displacement pump. A gear pump, for example, may be used as the first hydraulic pump 31. The first hydraulic pump 31 discharges hydraulic fluid taken in from the oil pan 37. The hydraulic fluid discharged by the first hydraulic pump 31 is supplied to the torque converter 21 through the first oil channel L1.

The second oil channel L2 communicates with the torque converter 21 and the oil pan 37. The second oil channel L2 is a drain oil channel for draining hydraulic fluid from the torque converter 21. The hydraulic fluid drained from the torque converter 21 is returned to the oil pan 37 through the second oil channel L2.

The first pressure control valve 32 is disposed in the second oil channel L2. The first pressure control valve 32 is a regulator valve for adjusting the pressure of the hydraulic fluid drained from the torque converter 21 so that the internal pressure of the torque converter 21 does not fall below a constant pressure.

The third oil channel L3 communicates with the first oil channel L1 and the second oil channel L2. The third oil channel L3 is coupled to the first oil channel L1 at a connection point P1 and is coupled to the second oil channel L2 at a connection point P2. The connection point P1 is the upstream end of the third oil channel L3 and the connection point P2 is the downstream end of the third oil channel L3. The connection point P1 is positioned on the upstream side of the second pressure control valve 33 and the connection point P2 is positioned on the downstream side of the first pressure control valve 32.

The second pressure control valve 33 is disposed in the third oil channel L3. The second pressure control valve 33 is a relief valve for adjusting the pressure of the hydraulic fluid supplied from the first hydraulic pump 31 so that the internal pressure of the torque converter 21 does not rise above a constant pressure.

In the present embodiment, the second pressure control valve 33 functions as a pressure control valve for reducing the internal pressure of the torque converter 21 when the lock-up clutch 22 is in the engaged state. The second pressure control valve 33 is held in an open state by the controller 40 when the lock-up clutch 22 is in the engaged state.

The fourth oil channel L4 communicates with the second hydraulic pump 34 and the transmission 10. The fourth oil channel L4 is an oil supply channel for supplying hydraulic fluid from the second hydraulic pump 34 to the transmission 10.

The second hydraulic pump 34 is driven by the power source 3. The second hydraulic pump 34 discharges the hydraulic fluid taken in from the oil pan 37. The hydraulic fluid discharged by the second hydraulic pump 34 is supplied to the transmission 10 through the fourth oil channel L4.

The fifth oil channel L5 communicates with the fourth oil channel L4, the sixth oil channel L6, and the lock-up clutch control valve 23. The fifth oil channel L5 is coupled to the fourth oil channel L4 at a connection point P3. The fifth oil channel L5 supplies, to the sixth oil channel L6, a portion of the hydraulic fluid supplied from the second hydraulic pump 34 to the fourth oil channel L4. The fifth oil channel L5 supplies, to the lock-up clutch control valve 23, a portion of the hydraulic fluid supplied from the second hydraulic pump 34 to the fourth oil channel L4.

The sixth oil channel L6 communicates with the fifth oil channel L5 and the on/off valve 35. The sixth oil channel L6 is coupled to the fifth oil channel L5 at an orifice 38. The orifice 38 is positioned on the upstream side of the sixth oil channel L6. The sixth oil channel L6 supplies, to the on/off valve 35, a portion of the hydraulic fluid supplied from the second hydraulic pump 34 to the fifth oil channel L5 through the fourth oil channel L4.

The on/off valve 35 can be switched between an ON-state (closed state) and an OFF-state (open state). The switching of the on/off valve 35 is controlled by the controller 40. In the present embodiment, the on/off valve 35 is an electromagnetic valve that can be switched between on and off by means of a control signal from the controller 40. When the lock-up clutch 22 is in the engaged state, the on/off valve 35 is switched to the ON-state and the hydraulic pressure of the sixth oil channel L6 is maintained at a high state. When the lock-up clutch 22 is in the disengaged state, the on/off valve 35 is switched to the OFF-state and the hydraulic pressure of the sixth oil channel L6 is maintained at a low state.

The seventh oil channel L7 communicates with the sixth oil channel L6 and the second pressure control valve 33. The seventh oil channel L7 is coupled to the sixth oil channel L6 at a connection point P4. The connection point P4 is positioned on the upstream side of the on/off valve 35. When the lock-up clutch 22 is in the engaged state, the on/off valve 35 is switched to the ON-state and the hydraulic pressure of the seventh oil channel L7 is maintained at a high state. As a result, the second pressure control valve 33 is held in the open state. When the lock-up clutch 22 is in the disengaged state, the on/off valve 35 is switched to the OFF-state and the hydraulic pressure of the seventh oil channel L7 is maintained at a low state. As a result, the second pressure control valve 33 is actuated to open and close so that the internal pressure of the torque converter 21 is kept at a constant pressure.

The eighth oil channel L8 communicates with the first oil channel L1 and the fourth oil channel L4. The eighth oil channel L8 is coupled to the first oil channel L1 at the connection point P1 and is coupled to the fourth oil channel L4 at a connection point P5. The connection point P5 is positioned on the upstream side of the fourth oil channel L4, the fifth oil channel L5, and the connection point P3. The third pressure control valve 36 is disposed in the eighth oil channel L8. The third pressure control valve 36 is a regulator valve for adjusting the pressure of the hydraulic fluid that passes through the fourth oil channel L4.

The controller 40 is a controller for controlling the entire power transmission device 2. The controller 40 controls the lock-up clutch control valve 23 and the on/off valve 35, etc. The controller 40 has a processor, such as a CPU, and a memory (RAM, ROM, etc.) having programs stored therein. The memory stores a lockup clutch engaged vehicle speed, a lockup clutch disengaged vehicle speed, a constant $\alpha$, and a constant $\beta$. The respective values of the lockup clutch engaged vehicle speed, the lockup clutch disengaged vehicle speed, the constant $\alpha$, and the constant $\beta$ are set to desired values as appropriate.

The controller 40 outputs a clutch pressure command signal to the lock-up clutch control valve 23 and causes the lock-up clutch 22 to become engaged when an engagement condition of the lock-up clutch 22 is established. In the present embodiment, the vehicle speed of the work vehicle 1 exceeding the lock-up clutch engagement vehicle speed is used as the engagement condition of the lock-up clutch 22. The controller 40 outputs the clutch pressure command signal to the lock-up clutch control valve 23 and causes the lock-up clutch 22 to become disengaged when a disengagement condition of the lock-up clutch 22 is established. In the present embodiment, the vehicle speed of the work vehicle 1 falling below the lock-up clutch engagement vehicle speed is used as the disengagement condition of the lock-up clutch 22.

The controller 40 causes the second pressure control valve 33 to open and close in response to the engagement and disengagement of the lock-up clutch 22.

Specifically, the controller 40 outputs the clutch pressure command signal to the lock-up clutch control valve 23 when the vehicle speed of the work vehicle 1 exceeds the lock-up clutch engagement vehicle speed. When the engagement of the lock-up clutch 22 is finished and the vehicle speed of the work vehicle 1 exceeds a value derived by adding the constant α to the lock-up clutch engagement vehicle speed, the controller 40 outputs a control signal to the on/off valve 35 and the on/off valve 35 switches to the ON-state. As a result, the second pressure control valve 33 is switched to the open state without increasing the hydraulic pressure in the seventh oil channel L7, and a portion of the hydraulic fluid supplied from the first hydraulic pump 31 to the torque converter 21 is returned to the oil pan 37 through the third oil channel L3 and the second oil channel L2 in order. As a result, loss of horsepower of the first hydraulic pump 31 is suppressed because the internal pressure of the torque converter 21 is reduced to a predetermined pressure that is lower than the constant pressure. The internal pressure (predetermined pressure) of the torque converter 21 when the lock-up clutch 22 is in the engaged state is preferably lower than the constant pressure and, while not limited in particular, is preferably of a degree that the inside of the torque converter 21 can be lubricated with the hydraulic fluid.

In this way, the controller 40 causes the internal pressure of the torque converter 21 to decrease by setting the second pressure control valve 33 to the open state when the lock-up clutch 22 is in the engaged state.

However, when the vehicle speed of the work vehicle 1 falls below a value derived by adding the constant β to the lock-up clutch disengagement vehicle speed, the controller 40 outputs a control signal to the on/off valve 35 before disengaging the lock-up clutch 22 and switches the on/off valve 35 to the OFF-state. As a result, the second pressure control valve 33 is switched to the closed state without the hydraulic pressure of the seventh oil channel L7 decreasing, and the hydraulic pressure of the third oil channel L3 is adjusted by the second pressure control valve 33. As a result, the internal pressure of the torque converter 21 recovers to the constant pressure.

In this way, when the vehicle speed of the work vehicle 1 falls below the value derived by adding the constant β to the lock-up clutch disengagement vehicle speed, the controller 40 raises the internal pressure of the torque converter 21 to the constant pressure by setting the second pressure control valve 33 to the closed state.

(Power Transmission Method)

FIG. 3 is a flow chart for explaining a power transmission method of the torque converter device 20.

In step S1, the controller 40 determines whether the vehicle speed of the work vehicle 1 has exceeded the lock-up clutch engagement vehicle speed. If the vehicle speed of the work vehicle 1 has exceeded the lock-up clutch engagement vehicle speed, the processing advances to step S2. If the vehicle speed of the work vehicle 1 does not exceed the lock-up clutch engagement vehicle speed, the processing of step S1 is repeated.

In step S2, the controller 40 outputs the clutch pressure command signal to the lock-up clutch control valve 23 and causes the lock-up clutch 22 to become engaged.

In step S3, the controller 40 determines whether the vehicle speed of the work vehicle 1 has exceeded a value derived by adding the constant α to the lock-up clutch engagement vehicle speed. If the vehicle speed of the work vehicle 1 has exceeded the value derived by adding the constant α to the lock-up clutch engagement vehicle speed, the processing advances to step S4. If the vehicle speed of the work vehicle 1 does not exceed the value derived by adding the constant α to the lock-up clutch engagement vehicle speed, the processing advances to step S5.

When the processing advances from step S3 to step S4, the controller 40 outputs a control signal to the on/off valve 35 and switches the on/off valve 35 to the ON-state (closed state) in step S4. Consequently, as indicated above, the second pressure control valve 33 is switched to the open state and the internal pressure of the torque converter 21 is reduced. When step S4 is completed, the processing returns to step S1.

When the processing advances from step S3 to step S5, the controller 40 determines, in step S5, whether the vehicle speed of the work vehicle 1 has fallen below the value derived by adding the constant β to the lock-up clutch disengagement vehicle speed. If the vehicle speed of the work vehicle 1 has fallen below the value derived by adding the constant β to the lock-up clutch disengagement vehicle speed, the processing advances to step S6. If the vehicle speed of the work vehicle 1 has not fallen below the value derived by adding the constant β to the lock-up clutch disengagement vehicle speed, the processing returns to step S1.

When the processing advances from step S5 to step S6, the controller 40 outputs, in step S6, a control signal to the on/off valve 35 and switches the on/off valve 35 to the OFF-state (open state). Consequently, as indicated above, the second pressure control valve 33 is switched to the closed state and the internal pressure of the torque converter 21 rises to the constant pressure.

In step S7, the controller 40 determines whether the vehicle speed of the work vehicle 1 has fallen below the lock-up clutch disengagement vehicle speed. If the vehicle speed of the work vehicle 1 has fallen below the lock-up clutch disengagement vehicle speed, the processing advances to step S8. If the vehicle speed of the work vehicle 1 has not fallen below the lock-up clutch disengagement vehicle speed, the processing returns to step S1.

In step S8, the controller 40 outputs the clutch pressure command signal to the lock-up clutch control valve 23 and causes the lock-up clutch 22 to become disengaged.

2. Second Embodiment

A power transmission device 2*a* according to a second embodiment will be explained. The power transmission device 2*a* according to the present embodiment is mounted in a similar work vehicle as the work vehicle 1 according to the first embodiment.

(Configuration of the Power Transmission Device 2*a*)

Figure 4:
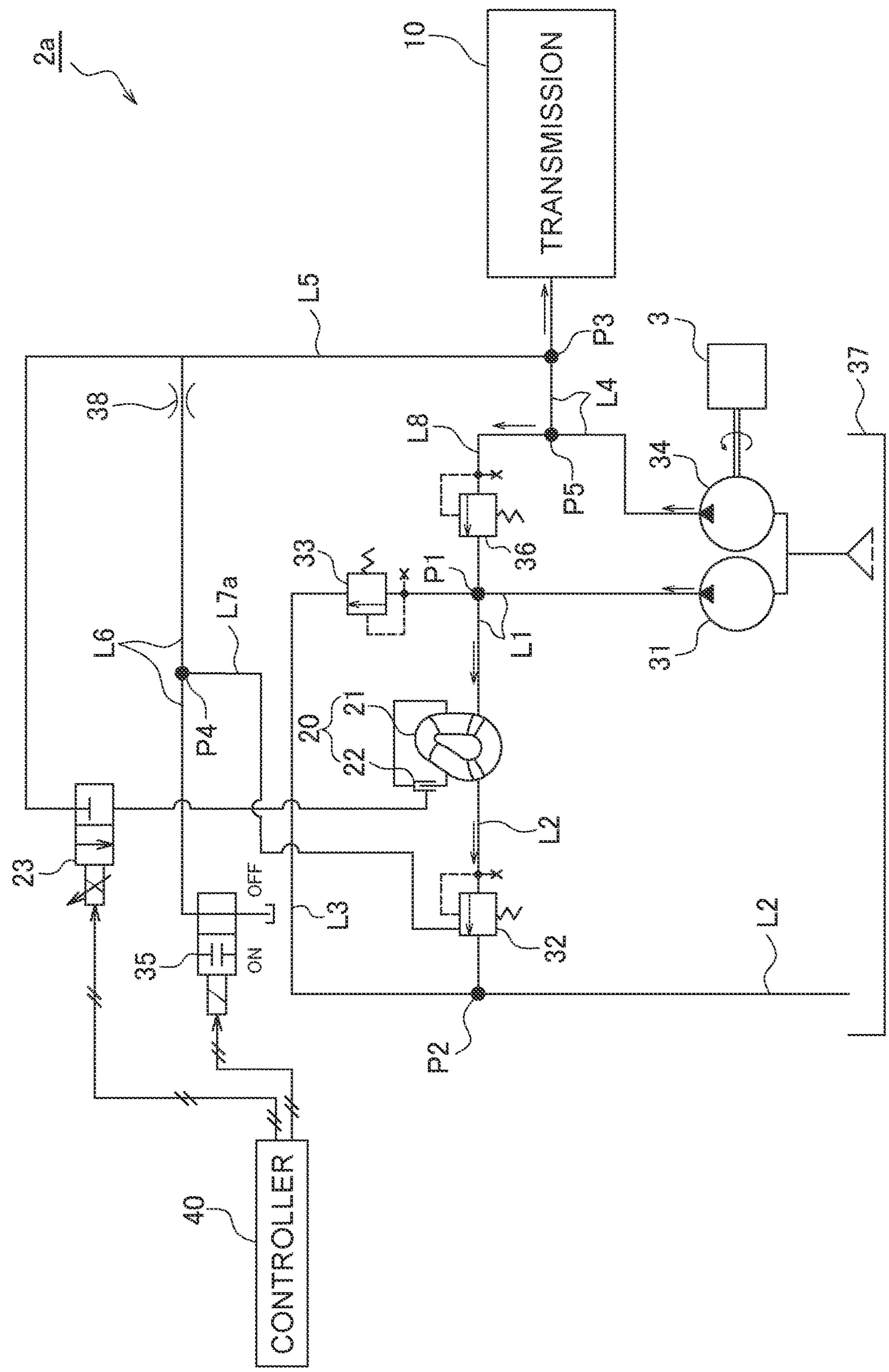
FIG. 4 is a hydraulic circuit diagram of the power transmission system according to a second embodiment.

FIG. 4 is a configuration diagram schematically illustrating a configuration of the power transmission device 2*a* according to the second embodiment.

The power transmission device 2*a* differs from the power transmission device 2 according to the first embodiment in that a seventh oil channel 7*a* communicates with the sixth oil channel L6 and the first pressure control valve 32. Said difference will mainly be explained hereinbelow.

The seventh oil channel L7*a* communicates with the sixth oil channel L6 and the first pressure control valve 32. The seventh oil channel L7*a* is coupled to the sixth oil channel L6 at the connection point P4. The connection point P4 is positioned on the upstream side of the on/off valve 35. When the lock-up clutch 22 is in the engaged state, the on/off valve 35 is switched to the ON-state and the hydraulic pressure of the seventh oil channel L7*a* is maintained at a high state. As a result, the first pressure control valve 32 is held in the open state. When the lock-up clutch 22 is in the disengaged state, the on/off valve 35 is switched to the OFF-state and the hydraulic pressure of the seventh oil channel L7*a* is maintained at a low state. As a result, the first pressure control valve 32 is actuated to open and close so that the internal pressure of the torque converter 21 is kept at the constant pressure.

The controller 40 causes the first pressure control valve 32 to open and close in response to the engagement and disengagement of the lock-up clutch 22.

Specifically, the controller 40 issues an engagement command to the lock-up clutch 22 when the vehicle speed of the work vehicle 1 exceeds the lock-up clutch engagement vehicle speed. When the engagement of the lock-up clutch 22 is finished and the vehicle speed of the work vehicle 1 exceeds the value derived by adding the constant $\alpha$ to the lock-up clutch engagement vehicle speed, the controller 40 outputs a control signal to the on/off valve 35 and the on/off valve 35 switches to the ON-state. Consequently, the pressure of the seventh oil channel 7*a* increase and the first pressure control valve 32 is switched to the open state, and the hydraulic fluid drained from the torque converter 21 is returned quickly through the second oil channel L2 to the oil pan 37. As a result, loss of horsepower of the first hydraulic pump is suppressed because the internal pressure of the torque converter 21 is reduced to a predetermined pressure that is lower than the constant pressure.

In this way, the controller 40 causes the internal pressure of the torque converter 21 to decrease by setting the first pressure control valve 32 to the open state when the lock-up clutch 22 is in the engaged state.

However, when the vehicle speed of the work vehicle 1 falls below the value derived by adding the constant $\beta$ to the lock-up clutch disengagement vehicle speed, the controller 40 outputs a control signal to the on/off valve 35 before disengaging the lock-up clutch 22 and switches the on/off valve 35 to the OFF-state. As a result, the pressure of the seventh oil channel 7*a* decreases and the first pressure control valve 32 is switched to the closed state, and the hydraulic pressure of the second oil channel L2 is adjusted by the first pressure control valve 32. As a result, the internal pressure of the torque converter 21 recovers to the constant pressure.

In this way, when the vehicle speed of the work vehicle 1 falls below the value derived by adding the constant $\beta$ to the lock-up clutch disengagement vehicle speed, the controller 40 raises the internal pressure of the torque converter 21 to the constant pressure by setting the first pressure control valve 32 to the closed state.

The power transmission method of the torque converter device 20 is the same as explained with the flow chart in FIG. 3.

Although embodiments of the present invention have been described so far, the present invention is not limited to the above embodiments and various modifications may be made within the scope of the invention.

In the first embodiment, the second pressure control valve 33 for holding the internal pressure of the torque converter 21 at a constant pressure is used as a pressure adjustment valve for reducing the internal pressure of the torque converter 21 when the lock-up clutch 22 is in the engaged state. In the second embodiment, the first pressure control valve 32 for holding the internal pressure of the torque converter 21 at a constant pressure, is used as a pressure adjustment valve for reducing the internal pressure of the torque converter 21 when the lock-up clutch 22 is in the engaged state. However, a pressure adjustment valve for reducing the internal pressure of the torque converter 21 may be provided separately from the first and second pressure controls valves 32 and 33. In this case, the pressure adjustment valve is disposed in the second oil channel L2 or in the third oil channel L3. When disposing the pressure adjustment valve in the second oil channel L2, the pressure adjustment valve is disposed on the upstream side of the first pressure control valve 32. When disposing the pressure adjustment valve in the third oil channel L3, the pressure adjustment valve is disposed on the upstream side of the second pressure control valve 33.

The invention claimed is:

1. A power transmission device disposed between a power source and a travel device, the power transmission device comprising:

- a torque converter device including a torque converter and a lock-up clutch and configured to transmit power from the power source to the travel device;
- a first hydraulic pump driven by the power source;
- a second hydraulic pump driven by the power source;
- a first oil channel for supplying hydraulic fluid from the first hydraulic pump to the torque converter;
- a second oil channel for draining hydraulic fluid from the torque converter;
- a third oil channel that communicates with the first oil channel and the second oil channel;
- a fourth oil channel for supplying hydraulic fluid from the second hydraulic pump to a hydraulic apparatus;
- a fifth oil channel that communicates with the fourth oil channel and an orifice;
- a sixth oil channel that communicates with the fifth oil channel and an on/off valve; and
- a seventh oil channel that communicates with the sixth oil channel and the pressure control valve,
- a pressure control valve disposed in the second oil channel or the third oil channel; and
- a controller configured to cause the pressure control valve to open and close,
- the on/off valve being configured to be switched between an ON-state and an OFF-state by the controller, the ON-state being a closed state and the OFF-state being an open state,
- the controller setting the pressure control valve to an open state when the lock-up clutch is in an engaged state, the controller setting the pressure control valve to the open state by setting the on/off valve to an ON-state.

2. The power transmission device according to claim 1, wherein the pressure control valve is disposed in the third oil channel.

3. The power transmission device according to claim 1, wherein the pressure control valve is disposed in the second oil channel.

4. The power transmission device according to claim 1, wherein the hydraulic apparatus is a transmission.

5. A power transmission method performed between the power source and the travel device using the power transmission device according to claim 1, the method comprising:

engaging the lock-up; and setting the pressure control valve to an open state when the lock-up clutch is in an engaged state.

* * * * *